March 7, 1967  G. L. MONEY  3,307,444
BLIND FASTENER
Filed June 21, 1965  3 Sheets-Sheet 1

INVENTOR
GLENN L. MONEY
BY Hoffmann and Yount
ATTORNEYS

March 7, 1967　　　　G. L. MONEY　　　　3,307,444
BLIND FASTENER

Filed June 21, 1965　　　　　　　　　　　　　3 Sheets-Sheet 2

INVENTOR

GLENN L. MONEY

BY *Hoffmann and Yount*

ATTORNEYS

March 7, 1967 G. L. MONEY 3,307,444
BLIND FASTENER

Filed June 21, 1965 3 Sheets-Sheet 3

INVENTOR

GLENN L. MONEY

BY *Hoffmann and Jouett*

ATTORNEYS

United States Patent Office 3,307,444
Patented Mar. 7, 1967

3,307,444
BLIND FASTENER
Glenn L. Money, Mentor, Ohio, assignor to The National Screw & Manufacturing Company, Cleveland, Ohio, a corporation of Ohio
Filed June 21, 1965, Ser. No. 465,265
7 Claims. (Cl. 85—74)

The present invention relates to fasteners and, more particularly, to so-called screw or bolt-type "blind" fasteners.

The principal object of the invention is the provision of a novel and improved structural-type blind fastener especially designed for use in airplanes, rockets and like articles, and which fastener will not only have maximum tensile and shear strengths for any given size and weight, but which will improve so-called clamp-up characteristics over presently known blind fasteners and will withstand vibrations including those of supersonic frequencies without failure.

Another object of the invention is the provision of a novel and improved blind fastener of the character referred to so constructed and arranged that a fastener of any given size can be used to secure parts together, the overall thickness of which may vary within rather wide limitations.

The invention resides in the use of certain constructions and materials and further objects and advantages of the invention will be hereinafter referred to or will be apparent from the following description of the preferred embodiments described with reference to the accompanying drawings forming a part of this specification in which similar reference characters designate corresponding parts, and in which.

Figure 1:
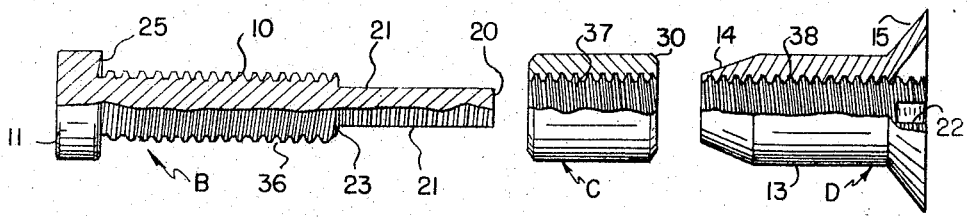
FIGURE 1 is an expanded view of a fastener embodying the present invention, with parts broken away and in axial section to show the construction.
Figure 2:
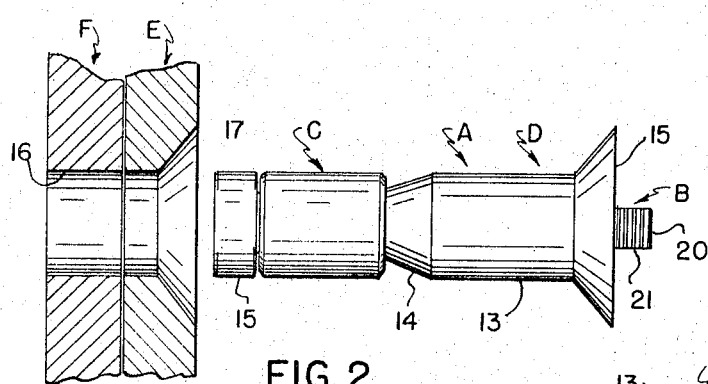
FIG. 2 is a view of the fastener shown in FIG. 1 assembled and positioned for insertion into aligned holes in two members to be secured together thereby.
Figure 3:
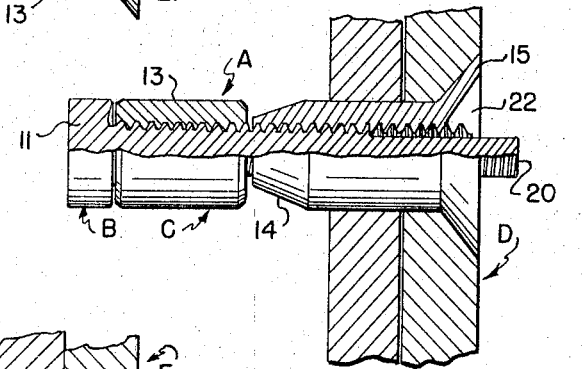
FIG. 3 is an axial, sectional view, with portions in elevation, showing the fastener in position in the members to be secured together thereby.

Referring to the drawings, the reference character A designates generally a blind fastener embodying the present invention. The fastener A consists of three discrete members: a screw B which forms the blind member or part of the fastener and which comprises a threaded shank 10 having a head 11 formed integral therewith at one end; an internally threaded cylindrical tubular sleeve C normally threaded onto the shank 10 of the screw B to a position adjacent to the head 11 and which sleeve forms the blind head part of the fastener; and an internally threaded nut D which forms the external or nonblind part of the fastener and which comprises a cylindrical shank or body portion 13 having a tapered or conical bearing surface 14 at one end and a countersunk-type head 15 formed integral therewith at the other end. Prior to use and preferably as a part of the manufacturing operation, the sleeve C and the nut D are assembled on the shank 10 of the screw B by being screwed thereon with the sleeve C interposed on the shank 10 between the head 11 of the screw and the conical end or bearing surface 14 of the nut D and with the sleeve abutting the head 11 of the screw, all as shown in FIG. 2. When used, the assembled fastener is inserted with the screw head 11 leading into aligned holes in members to be secured together thereby, for example, the holes 16, 17 in the plate-like members E, F, until the head 15 of the nut D abuts the accessible side of the members. The maximum diameters of the head 11 of the screw B, the sleece C and the shank or body portion 13 of the nut D are all substantially equal, and the aligned holes, i.e., the holes 16, 17, in the members to be secured together thereby, are so farmed as by drilling, etc., that the aforementioned parts of the fastener can be inserted therein or therethrough, but will not be loose therein.

After the fastener A is assembled with the members to be secured together thereby, the nut and bolt parts of the fastener are drawn together, in other words, the fastener is contracted, by relative rotation between the screw B and the nut D to draw and expand the nut end or non-blind end of the sleeve C, that is, the end of the sleeve facing the accessible side or sides of the members E, F over the adjacent tapered or conical end 14 of the nut D to form an internal head. Preferably the screw B is rotated to contract the fastener and expand the blind head sleeve C over the conical end 14 of the nut D and move it into tight clamping engagement with the adjacent, that is, the blind side of the adjoining member F while the head 15 of the nut D is drawn into tight clamping engagement with the adjacent or accessible side of the member E. As shown, the end of the shank 10 of the screw B opposite the head 11 is provided with a driving connection in the form of an extension 20 which normally projects beyond the head of the nut D. The projection 20 is provided with two opposite flat sides 21 and is adapted to be engaged or received in a suitable, complementary aperture in the driving tool. The head 15 of the nut D is provided with slots 22 adapted to be engaged by a suitable tool to hold the same stationary while the screw B is rotated. The driving slots 22 may be omitted if desired and the fastener driven with a driver not requiring driving connections on the nut part.

The projection 20 on the shank 10 of the screw B is weakened adjacent to the inner ends of the flat sides 21 by a groove 23 which leaves a notched section of predetermined area less than that of any other part of the screw B and, when the fastener is driven, the screw B is rotated until the flattened end portion 20 breaks away from the shank 10 at the notched section. This assures tightening or driving of the fastener to a predetermined stress or load. When the fastener A is driven to a predetermined tension, the members E, F are securely fixed together or clamped betwen the head 15 of the nut D which forms the external or nonblind head and engages the side of the member E adjacent thereto, and the expanded end of the sleeve C which forms the internal or blind head and engages the side of the member F adjacent thereto. The head 15 of the nut D as shown is of the countersunk type, and the hole 16 in the member E is countersunk to accommodate the head, the construction being such that in use the head 15 of the nut D is flush with the exterior of the outer member E. This feature, however, is not essential to the invention, but is preferred in many applications, such as where the fastener is employed on the exterior of an airplane, as it provides a smooth surface. Obviously, other types of either countersunk or exposed heads may be employed.

The shank side or bearing face 25 of the head 11 of the screw B may be undercut as indicated, if desired. If undercut, approximately the radially outer two-thirds of the undercut bearing surface is preferably made frusto-conical in shape, as shown in the drawings, and so as to form an angle of about 20° with a plane normal to the longitudinal axis of the screw. Other angles, however, may be employed. The radially inner part of the bearing surface 25 merges into the adjacent portion of the shank with a smooth radius tangent to the shank of the screw adjacent thereto. As the head 11 of the screw B is drawn against the head or blind end of the sleeve C to force the nut end of the sleeve C over the tapered bearing surface at the blind end of the nut D, if the bearing face 25 is undercut the inwardly sloping frusto-conical surface of the undercut tends to, and, as the parts are drawn together into their final driven positions, does contract the end of the sleeve C engaged thereagainst. To facilitate this action, the outer circumference of the adjacent end of the sleeve C may be beveled, as at 30, so that the end of the sleeve will conform better with the frusto-conical surface of the head 11 of the screw B. The external end of the opening through the sleeve is also preferably chamfered or beveled to facilitate entrance of the adjoining end of the nut or external member. Preferably, both ends of the sleeve C are beveled thereby making the sleeve reversible and thus facilitating assembly.

As the parts of the fastener A are drawn together into their final operative or driven positions, irrespective of whether the bearing surface 25 of the screw B is or is not undercut, the pressure of the sleeve C upon the blind end of the tapered portion 14 of the nut D tends to and does spring and bend the end of the tapered portion of the nut D into tight clamping engagement with the shank 10 of the screw B to effect a secure nut-bolt lock between the screw B and the nut D, which prevents or resists unthreading and loosening of the bolt A during use, as by vibrations, etc.

In practice, the fasteners A are made in predetermined sizes and the various parts are designed and proportioned, etc., to produce maximum strength and minimum weight for a given size. The shanks of the screws of the bolts are preferably made to standard screw sizes, for example, 6–40, 8–36, 10–32, 12–28, etc., and a given shank construction predetermines, to at least a large extent, the construction of the other parts, etc., because the part of the shank of the screw immediately adjacent to the head thereof which is subjected to a complex combination of shear, torsion and tensile stresses and loads is the part of the fastener most likely to fail. Having in mind the material of which the various parts of the fastener is made, the diameter $a$ of the head of the screw should be about one and one half times, or slightly less than the effective shank diameter.

In the embodiment shown, the thread on the shank 10 of the screw B shown is designated 36, is of the truncated type having a flat root and a flat crown, is formed on the shank 10 by thread rolling and extends along the shank 10 to a point immediately adjacent to the head 11 of the screw. The root diameter of the thread 36 on the shank 10 is increased with respect to that of a standard screw thread of the same size or maximum thread diameter $b$, see Screw-Thread Standards for Federal Services, Handbook H28 (1957) Part I, United, American, American National and National Miniature Threads, published by the U.S. Department of Commerce, National Bureau of Standards, by grinding off the crests of the other threads of the dies to form a thread on the shank 10 having a root diameter $c$ greater than the standard root diameter $d$ for the same maximum thread diameter $b$ but not sufficiently great to cause interference therebetween and the internal mating threads 37 and 38 in the sleeve C and the nut D, respectively, which are preferably formed with a standard tap. The root diameter $c$ is preferably made equal to about 83% to 84% of the maximum thread diameter $b$.

The part of the shank of the screw immediately adjacent to the head, as previously mentioned, is the part of the shank most likely to fail. This is particularly true of the smaller size fasteners. Accordingly, the effective diameter of the shank 10 of the screw for a short section immediately adjacent to the head preferably is increased over that of the remainder of the screw for a length equal to about .125 inches, by grinding off the crests of the threads of the dies along the head side to produce a thread root diameter $e$ equal to about 85% to 86% of the maximum thread diameter $b$.

The fasteners are made in different lengths, each designed to fasten two or more members together having an overall thickness within certain limits, and the lengths of the respective parts while being made as short as possible consistent with other requirements in an effort to save weight, are so proportioned that when the fastener is in use or driven, the blind end of the nut D is spaced some distance, preferably about two to six threads, from the head 11 of the screw so that an appreciable part of the thread 37 in the sleeve C remains in engagement with the thread 36 on the screw B. The flexibility of the tapered or blind end of the nut D, if desired, may be increased by countersinking or counterboring the same for a short distance. The nut D, as shown, is countersunk at 40 to a slight taper of approximately 25°, but this is not essential to the present invention.

The fasteners A, as previously stated, are made in different lengths, each designed to fasten two or more members together having a predetermined overall thickness, but the thickness of the members will vary since all parts are manufactured to plus or minus tolerances. Variations in total or overall thickness of the parts secured together within limits equal to about two to five thread convolutions will not interfere with the operation of the bolt. Slightly greater thicknesses, however, will not prevent satisfactory operation of the fastener including the locking feature since in all events the tapered or conical blind end of the nut D will be spun or otherwise contracted and bent into tight clamping engagement with the threads of the shank of the screw B.

Figure 4:
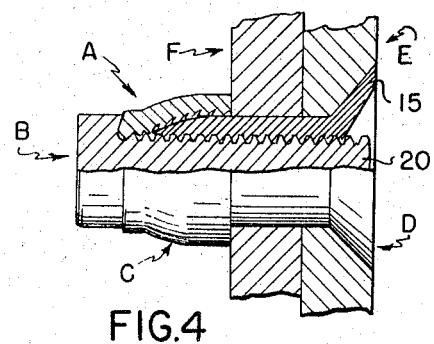
FIG. 4 is a view similar to FIG. 3 but showing the fastener in operation fixedly securing the members together.
Figure 5:
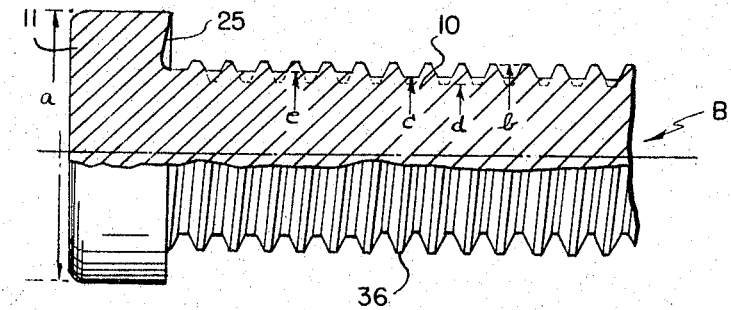
FIG. 5 is an enlarged, fragmentary, axial, sectional view, with portions in elevation, of the head end of the screw or internal member.
Figure 6:
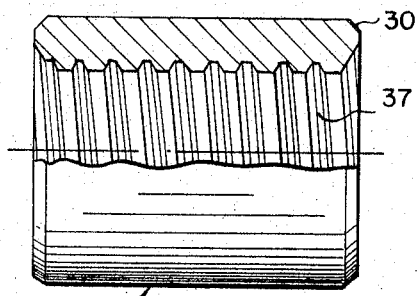
FIG. 6 is an enlarged, axial, sectional view, with portions in elevation, of the sleeve or blind head member.
Figure 7:
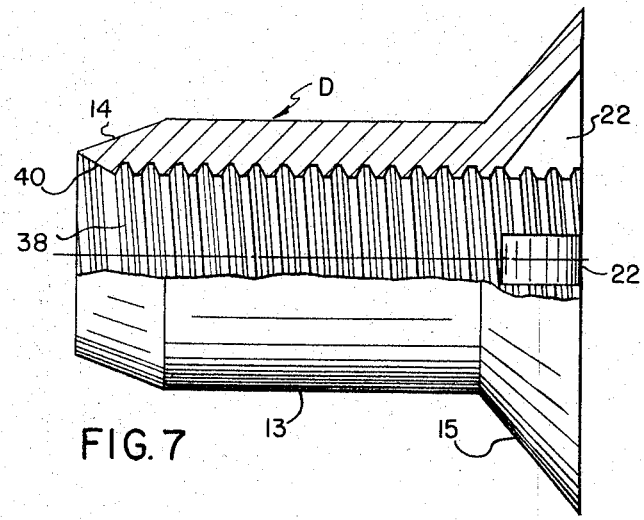
FIG. 7 is an enlarged, axial, sectional view, with portions in elevation, of the nut or external member.
Figure 8:
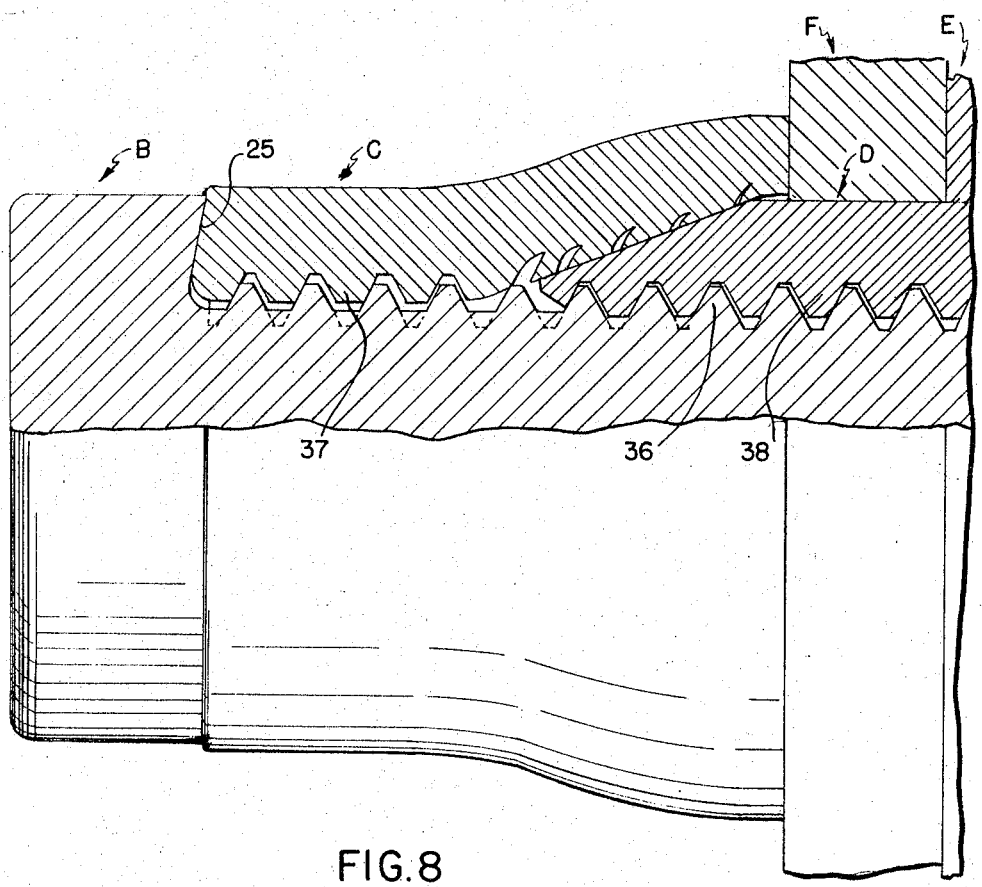
FIG. 8 is an enlarged, fragmentary, axial, sectional view of the fastener in operation.
Figure 9:
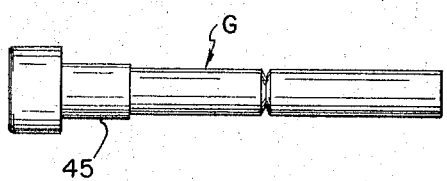
FIG. 9 is an elevational view of a blank similar to that used to make the screw part of the fastener.

The length of the nut D is preferably such that when the bolt is in use, the head end of the tapered portion 14 of the nut, i.e., the larger end thereof, is preferably flush with or projects a short distance not greater than about .093" from the inner or blind side of the member F. When the sleeve C is expanded over the tapered bearing surface 14 of the nut D, the nut end or nonblind end thereof expands or flares out, becomes thinner and assumes a frusto-conical shape, as illustrated in FIGS. 4 and 8. The wall thickness of the opposite end of the sleeve, however, increases because of the compression or force exerted thereagainst by the head of the screw. The hoop tension in the sleeve C produced by the expansion thereof forces the end of the tapered nose of the nut into tight engagement with the threads of the screw to produce an interference thread lock which securely locks the nut D on the screw B. This is probably supplemented by contraction of the interior diameter of the sleeve caused by the increase in wall thickness of the sleeve, referred to at the tip of the nut.

The provision of a thread on the interior of the collar C has many advantages which were not obvious or apparent to prior persons working in this art, for example, the threads of the expanding sleeve move over the nose of the nut at the same rate as the threads of the screw move into the nut and the bearing surfaces between the sleeve and nut are essentially the flattened crests of the thread of the sleeve. The presence of threads on the interior of the collar C therefore results in a reduction of the friction between the sleeve and nut during the formation of the blind head incident to driving of the fastener. The driven fasteners also exhibit more positive and stronger tensile strength than fasteners having non-threaded sleeves, and a reduction in the columnar effect from the blind side of the work to the point where threads of the screw and the threads of the sleeve are engaged, due to the increase in basic wall thickness. Since there is less columnar effect, the grip range can be extended. Because of the increase in the basic or effective wall thickness of the sleeve or collar C due to the internal thread, the overall diameter of the screw head 11, sleeve C and cylindrical portion 13 of the nut may be reduced slightly over that which would be necessary to obtain a fastener of equal performance to that of a similar fastener having a non-threaded sleeve.

Many of the aforementioned advantages may be obtained by merely providing internal threads, about two to six convolutions, at the screw head end of the sleeve or collar C with the remainder of the collar or sleeve having an interior diameter not substantially greater than the maximum thread diameter of the screw.

The screw part B is formed of metal having a uniform composition and high tensile strength preferably in excess of 180,000 p.s.i. but not less than 140,000 p.s.i. and a ductility of approximately 15% to 40% as measured by reduction of area, that is, the difference between the original cross-section area of a sample and the area of its smallest cross-section, measured after fracture due to tension, expresses in percentage of the original cross-sectional area. Preferred materials are alloy steels containing carbon .20% to 65% and one or more hardening agents as follows: nickel .40% to 3.75%, molybdenum .15% to .30%, chromium .40% to 1.20% heat treated to give the required physical properties, for example, the following:

|     | C | Ni | Mo | Cr | Mn |
|-----|-----|-----|-----|-----|-----|
| (a) | .35–.40 |  | .20–.30 |  | .70–.90 |
| (b) | .38–.43 | .40–.70 | .20–.30 | .40–.60 | .75–1.00 |
| (c) | .27–.33 | .40–.70 | .15–.25 | .40–.60 | .70–.90 |
| (d) | .33–.38 | .40–.70 | .20–.30 | .40–.60 | .75–1.00 |
| (e) | .28–.33 |  | .15–.25 | .80–1.10 | .40–.60 |
| (f) | .38–.43 | 1.00–1.40 |  |  | .55–.75 |
| (g) | .28–.33 | 3.25–3.75 |  |  | .70–.90 |

Other suitable materials are:

A. Certain super strength ferrous alloys, for example, the following:

|     | C | Mn | Si | Cr | V | Mo | W |
|-----|-----|-----|-----|-----|-----|-----|-----|
| (h) | .30–.40 | .20–.40 | .80–1.20 | 4.75–5.50 | .30–.50 | 1.25–1.75 |  |
| (i) | .30–.40 | .20–.40 | .80–1.20 | 4.75–5.50 | .10–.50 | 1.25–1.75 | 100–1.70 |

B. Certain high temperature alloys, for example, the following:

|     | C | Mn | Si | Cr | Ni | Mo | Ti | Va | Al | Remainder |
|-----|-----|-----|-----|-----|-----|-----|-----|-----|-----|-----|
| (j) | [1].08 | 1.00–2.00 | .40–1.00 | 13.5–16.0 | 24.0–27.0 | 1.00–1.50 | 1.75–2.25 | .10–.50 | [1].35 | Fe and Imp. |

|     | C | Mn | Si | Cr | Ni | Co | Mo | W | Co or Ta | Iron |
|-----|-----|-----|-----|-----|-----|-----|-----|-----|-----|-----|
| (k) | .32–.42 | 1.00–2.00 | [1]1.00 | 19.0–21.0 | 19.0–21.0 | [2]40 | 3.50–4.50 | 3.50–4.50 | 3.50–4.50 | [1]5.00 |

[1] Max.
[2] Min.

C. Certain light alloys, for example, the following:

|     | Al | Va | Remainder |
|-----|-----|-----|-----|
| (l) | 6.00 | 4.0 | Ti |

|     | Cu | Fe | Si | Mn | Mg | Zn | Cr | Ti | Remainder |
|-----|-----|-----|-----|-----|-----|-----|-----|-----|-----|
| (m) | 1.20–2.10 | .70 | .50 | .30 | 2.10–2.90 | 5.10–6.10 | .18–.40 | .20 | Al |

|     | Cu | Fe | Si | Mn | Mg | Zn | Cr | Remainder |
|-----|-----|-----|-----|-----|-----|-----|-----|-----|
| (n) | 3.80–.490 | .50 | .50 | .30–.90 | 1.20–1.80 |  | .25 | .10 | Al |

D. Certain stainless steel, for example, the following:

|     | C | Mn | Cr | Si |
|-----|-----|-----|-----|-----|
| (o) | [1].15 | [1]1.00 | 11.5–13.5 | [1]1.00 |
| (p) | [1].20 | [1]1.00 | 15.0–17.0 | [1]1.00 |

[1] Max.

The screw part is formed and threaded by conventional methods while the material is relatively soft and subsequently heat-treated to obtain the desired physical properties.

The parts made of the materials referred to are heat-treated to a homogeneous or substantially homogeneous structure having the desired physical properties preferably by heating the same to a temperature of from about 1550° to 1600° F. for a period of about thirty-five minutes in a consistent atmosphere comprising $H_2$ about 40%, $C_0$ about 20%, $CH_4$ 1.0% maximum, $CO_2$ 0.5% maximum, $O_2$ 0.5% maximum and the balance $N_2$, and having a due point of from about 40° to 70°, preferably from about 42% to 47%. When so treated the parts have a surface carbon of about 0.35% to 0.45% or 0.50%. The heated parts are then quenched in oil without removal from the atmosphere thereby producing a homogeneous or substantially homogeneous uniform martensitic structure containing not less than 50% martensite. The parts are thereafter given one or more draws of about 600° to 900° F., preferably from about 700° to 750° F. Each draw should be held for about two hours.

The blind head part or sleeve C is continuous and is made of metal having a uniform composition, a tensile strength between 50,000 p.s.i. and 145,000 p.s.i., a ductility as measured by reduction of area as explained above of from about 40% to 76%, and the ability to work-harden at least twice that of low carbon basic steel as measured by increase in hardness, that is, the difference between the original hardness of a test sample and the hardness thereof after working.

Preferred materials are stainless steels extremely sensitive to cold-working.

Examples of such materials are:

|     | C    | Mn     | Cr     | Ni    | Si      | Cu   | Mo    | Remainder |
| --- | ---- | ------ | ------ | ----- | ------- | ---- | ----- | --------- |
| (q) | [1].12 | .20–2.5 | [2]17.0 | [2]7.0 | .20–1.5 | [1].50 | [1].75 | S .10 max. with P .17 max. + .15–.35Se |

[1] Max.
[2] Min.

|     | C    | Mn    | Cr        | Ni         | Si     |
| --- | ---- | ----- | --------- | ---------- | ------ |
| (r) | [1].15 | [1]2.00 | 17.0–19.0 | 8.0–10.0   | [1]1.00 |
| (s) | [1].12 | [1]2.00 | 17.0–19.0 | 10.0–13.0  | [1]1.00 |

[1] Max.

The alloys mentioned may be given the same heat treatment mentioned above. The thread is preferably formed in the sleeve C before the sleeve is heat treated.

Other materials, however, may be used such as alloy steels of the character mentioned above annealed to provide the desired physical property.

The external or nonblind part has a tensile strength and a ductility not less than the tensile strength and the ductility of the blind head part and not substantially greater than that of the internal or blind part. It is preferably made of material similar to the material mentioned above as suitable for use in the internal or blind part but may be made of material similar to that of the blind head part. The internal or blind member and the external or nonblind member, should however, be made of materials which will not gall when screwed together.

The degree or angle of taper of the conical bearing surface or portion 14 of the nut D is also reasonably critical as the longitudinal and radial forces produced thereby against the blind head part or sleeve C which, as previously stated, is continuous, must be proportioned such that the sleeve will not split but will be adequately cold worked during driving of the fastener. The dimensions of the parts and the materials of which they are made are such that in driving the material at the expanded end of the blind head part is stressed beyond its yield point but not up to its ultimate strength. The sleeve C is made as short as possible, consistent with other requirements, to reduce its weight but preferably has a length not less than about nine to twelve times the pitch of the threads on the parts. The sleeve must not be expanded into too flat a shape to withstand the thrust imposed thereon in use. The angle of the bevel end portion 14 is preferably about 15° to 21°. Considering the materials mentioned, the diameter of the head 11 of the screw is preferably approximately, or slightly less than, about one and one-half times the effective diameter of the shank of the screw B. This determines the thickness of the sleeve C and the cylindrical portion 13 of the nonblind or external nut part D. The height of the head 11 of the screw B is made as small as possible, preferably about one-half to two-thirds of the maximum thread diameter.

From the foregoing, it is believed that it will be apparent that materials employed and the dimensions of the different parts of the fastener are not only critical but are held to quite close tolerances, for example, the wall thickness of the sleeve C and the cylindrical body portion of the nut D, which are functions of the relative diameters of the shank of the screw B and the head thereof. A number of preferred dimensions for a few representative screw sizes are given for purposes of illustration. The internal and external threads are Unified Class 3A and 3B or American National Class 3 Fine Thread Series as modified by the given dimensions and tolerances.

| Screw Size | | a | b | c | d | e |
| --- | --- | --- | --- | --- | --- | --- |
| 4-48 | Min. | .156 | .1075 | .0870 | .0819 | .0938 |
|      | Max. | .160 | .1120 | .0895 | .0864 | .0965 |
| 6-40 | Min. | .195 | .1320 | .1070 | .1036 | .1146 |
|      | Max. | .199 | .1380 | .1110 | .1073 | .1183 |
| 10-32 | Min. | .255 | .1900 | .1548 | .1471 | .1502 |
|       | Max. | .260 | .1840 | .1578 | .1517 | .1627 |
| 12-28 | Min. | .306 | .2095 | .1750 | .1672 | .1807 |
|       | Max. | .311 | .2160 | .1780 | .1722 | .1832 |
| ¼-28 | Min. | .369 | .2435 | .2080 | .2011 | .2130 |
|      | Max. | .374 | .2500 | .2120 | .2062 | .2165 |

From the foregoing it will be apparent that the preferred fasteners of the present invention are manufactured to very close tolerances and are what might be called precision devices.

As previously stated, the screw B is preferably made by thread rolling and, for this purpose, conventional practice is followed except for the fact that the part 45 of the blank G which forms the section of increased effective diameter of the screw when this feature is employed is made slightly larger than the other portion of the shank of the blank. In practice, it has been found that with respect to the screws enumerated above, this diameter should be about 1% to 3% greater than the diameter of the blank proper.

With the fasteners of the present invention the members or plates E, F, are embraced or held together between blind and nonblind heads, at least one of which is ductile or relatively ductile. The ductile head absorbs and is not harmed by vibrations to which the fasteners are subjected to in use. Because of this the fastener, in addition to having a high shear and tensile characteristics, will not fail when subjected to vibrations as do commercially available fasteners not having a corresponding part thereof made of ductile material of the character mentioned.

Comparative tests between high strength fasteners manufactured in accordance with the present invention and blind fasteners cocmercially available show the present fastener, wherein the interior of the sleeve C is threaded and the nonblind end thereof expanded in such a way that a portion of the threads of the blind end remain in engagement with the threads of the screw, to be far superior to the commercially available fasteners. As an example of the superior properties of the present fastener, tests show that the tensile strength and clamp-up characteristics greatly exceed those of commercially available fasteners, that is, the members secured together thereby are and can be drawn much tighter together by the fastened of the present invention than with presently available fasteners and will sustain greater loads without failure.

From the foregoing description of the preferred embodiment of the invention, it will be apparent that the objects heretofore enumerated and others have been accomplished and that there has been provided a novel and improved so-called blind fastener or bolt which, for a given size, has maximum performance characteristics and particularly high so-called tensile strength and clamp-up ability. While the preferred embodiment of the invention has been described in considerable detail, the invention is not limited to the precise constructions shown and/or described and it is the intention to cover hereby all adaptations, modifications and uses thereof which come within the practice of those skilled in the art to which the invention relates and within the scope of the appended claims.

Where ductility is expressed in the appended claims it, is to be understood that it refers to or is measured by reduction of area, that is, the difference between the original cross-sectional area of a test sample or specimen and the area of its smallest cross-section, measured after fracture by tension, expressed as a percentage of the original cross-sectional area.

What I claim is:

1. In a structural blind fastener for use in attaching together at least two members a side of one of which is inaccessible or blind and having aligned openings therein of substantially uniform diameter with the possible exception of the accessible end which may be counterbored, a relatively nonductible substantially homogeneous discrete internal or blind metal part comprising a cylindrical shank provided with a thread, said blind part including a head formed integral with the blind end of said shank the diameter of which head is approximately 150% of the effective diameter of said shank, a projection forming a driving connection on the nonblind end of said shank connected thereto by a section of less strength than the strength of the minimum effective cross-sectional area of said shank, a relatively ductile blind head part in the form of a continuous cylindrical sleeve having an internal thread at at least one end of not less than two convolutions and at no place an inside diameter substantially greater than the maximum thread diameter of said thread on said shank of said blind part and an outside diameter substantially equal to the diameter of said head of said blind part and being threaded onto said shank of said blind part with said one end adjacent to said head thereof, and an external or nonblind metal part threaded onto the threaded section of said shank of said blind part, said nonblind part comprising a cylindrical tubular-like body portion having an outside diameter substantially equal to the diameter of said head of said blind part, said body portion having a head formed integral therewith at the nonblind end thereof for engaging the accessible or nonblind side of said members and an axially extending frusto-conically shaped bearing surface on its other end inclined outwardly and towards the nonblind end of said internal part for expanding the end of said blind head part adjacent thereto beyond the yield strength of the material thereof but under the ultimate strength thereof to form a blind head engaging the inaccessible side of said members upon said frusto-conical surface being forced into said end of said blind head part upon rotation of said blind part relative to said nonblind part in driving said fastener whereby said members are secured together by being embraced between blind and nonblind heads engaging opposite sides thereof one of which heads is relatively hard but more ductile than the internal or blind part of the fastener.

2. In a structural blind fastener for use in attaching together at least two members a side of one of which is inaccessible or blind and having aligned openings therein of substantially uniform diameter with the possible exception of the accessible end which may be counterbored, a relatively non-ductile substantially homogeneous discrete internal or blind metal part comprising a cylindrical shank provided with a thread, said blind part including a head formed integral with the blind end of said shank the diameter of which head is approximately 150% of the effective diameter of said shank, a projection forming a driving connection on the nonblind end of said shank connected thereto by a section of less strength than the strength of the minimum effective cross-sectional area of said shank, a relatively ductile blind head part in the form of a continuous cylindrical sleeve having an internal thread at at least one end of not less than two convolutions and at no place an inside diameter substantially greater than the maximum thread diameter of said thread on said shank of said blind part and an outside diameter substantially equal to the diameter of said head of said blind part and being threaded onto said shank of said blind part with said one end adjacent to said head thereof, and an external or nonblind metal part threaded onto the threaded section of said shank of said blind part, said nonblind part comprising a cylindrical tubular-like body portion having an outside diameter substantially equal to the diameter of said head of said blind part, said body portion having a head formed integral therewith at the nonblind end thereof for engaging the accessible or nonblind side of said members and an axially extending frusto-conically shaped bearing surface on its other end inclined outwardly and towards the nonblind end of said internal part for expanding the end of said blind head part adjacent thereto beyond the yield strength of the material thereof but under the ultimate strength thereof to form a blind head engaging the inaccessible side of said members upon said frusto-conical surface being forced into said end of said blind head part upon rotation of said blind part relative to said nonblind part in driving said fastener whereby said members are secured together by being embraced between blind and nonblind heads engaging opposite sides thereof one of which heads is relatively hard but more ductile than the internal or blind part of the fastener, said internal, blind head and external parts being of such lengths that when said fastener is driven not less than about two convolutions of said internal threads of said blind head part is in engagement with said thread of said internal part.

3. In a structural blind fastener for use in attaching togther at least two members a side of one of which is inaccessible or blind and having aligned openings therein of substantially uniform diameter with the possible exception of the accessible end which may be counterbored, a relatively non-ductile substantially homogeneous discrete internal or blind metal part comprising a cylindrical shank provided with a thread, said blind part including a head formed integral with the blind end of said shank the diameter of which head is approximately 150% of the effective diameter of said shank, a projection forming a driving connection on the nonblind end of said shank connected thereto by a section of less strength than the strength of the minimum effective cross-sectional area of said shank, a relatively ductile blind head part in the form of a continuous cylindrical sleeve internally threaded from end to end and having an outside diameter substantially equal to the diameter of said head of said blind part and being threaded onto said shank of said blind part adjacent to said head thereof, and an external or nonblind metal part threaded onto the threaded section of said shank of said blind part, said nonblind part comprising a cylindrical tubular-like body portion having an outside diameter substantially equal to the diameter of said head of said blind part, said body portion having a head formed integral therewith at the nonblind end thereof for engaging the accessible or nonblind side of said members and an axially extending frusto-conically shaped bearing surface on its other end inclined outwardly and towards the nonblind end of said internal part for expanding the end of said blind head part adjacent thereto beyond the yield strength of the material thereof but under the ultimate strength thereof to form a blind head engaging the inaccessible side of said members upon said frusto-conical surface being forced into said end of said blind head part upon rotation of said blind part relative to said nonblind part in driving said fastener whereby said members are secured together by being embraced between blind and nonblind heads engaging opposite sides thereof one of which heads is relatively hard but more ductile than the internal or blind part of the fastener.

4. In a high shear and load carrying blind fastener for use in attaching together at least two members a side of one of which is inaccessible or blind and having aligned openings therein of substantially uniform diameter with the possible exception of the accessible end which may be counterbored, a relatively non-ductile substantially homogeneous discrete internal or blind metal part having a tensile strength of not less than about 140,000 p.s.i. and a ductility of about 15% to 45% and comprising a cylindrical shank provided with a thread, said blind part including a head formed integral with the blind end of said shank the diameter of which head is approximately 150% of the effective diameter of said shank, a projection forming a driving connection on the nonblind end of said shank connected thereto by a section of less strength than the strength of the minimum cross-sectional area of said shank, a relatively ductile blind head part at least twice as sensitive to cold-working as low carbon basic steel as measured by increase in hardness and having a tensile strength of from about 50,000 p.s.i. to 145,000 p.s.i. and a ductility of about 40% to 76% and being in the form of a continuous cylindrical sleeve having an internal thread at at least one end of not less than two convolutions and at no place an inside diameter substantially greater than the maximum thread diameter of said thread on said shank of said blind part and an outside diameter substantially equal to the diameter of said head of said blind part and being threaded onto said shank of said blind part with said one end adjacent to said head thereof, and an external or nonblind metal part having a tensile strength not less than and a ductility not greater than the tensile strength and ductility of said blind head part threaded onto the threaded section of said shank of said blind part, said nonblind part comprising a cylindrical tubular-like body portion having an outside diameter substantially equal to the diameter of said head of said blind part, said body portion having a head formed integral therewith at the nonblind end thereof for engaging the accessible or nonblind side of said members and an axially extending frusto-conically shaped bearing surface on its other end inclined outwardly and towards the nonblind end of said internal part for expanding the end of said blind head part adjacent thereto beyond the yield strength of the material thereof but under the ultimate strength thereof to form a blind head engaging the inaccessible side of said members and to cold work the material of said blind head part upon said frusto-conical surface being forced into said end of said blind head part upon rotation of said blind part relative to said nonblind part in driving said fastener whereby said members are secured together by being embraced between blind and nonblind heads engaging opposite sides thereof one of which heads is relatively hard but more ductile than the internal or blind part of the fastener.

5. In a high shear and load carrying blind fastener for use in attaching together at least two members a side of one of which is inaccessible or blind and having aligned openings therein of substantially uniform diameter with the possible exception of the accessible end which may be counterbored, a relatively non-ductive substantially homogeneous discrete internal or blind metal part having a tensile strength of not less than about 140,000 p.s.i. and a ductility of about 15% to 45% and comprising a cylindrical shank provided with a thread, said blind part including a head formed integral with the blind end of said shank the diameter of which head is approximately 150% of the effective diameter of said shank, a projection forming a driving connection on the nonblind end of said shank connected thereto by a section of less strength than the strength of the minimum cross-sectional area of said shank, a relatively ductile blind head part at least twice as sensitive to cold-working as low carbon basic steel as measured by increase in hardness and having a tensile strength of from about 50,000 p.s.i. to 145,000 p.s.i. and a ductility of about 40% to 76% and being in the form of a continuous cylindrical sleeve internally threaded from end to end and having an outside diameter substantially equal to the diameter of said head of said blind part and being threaded onto said shank of said blind part adjacent to said head thereof, and an external or nonblind metal part having a tensile strength not less than and a ductility not greater than the tensile strength and ductility of said blind head part threaded onto the threaded section of said shank of said blind part, said nonblind part comprising a cylindrical tubular-like body portion having an outside diameter substantially equal to the diameter of said head of said blind part, said body portion having a head formed integral therewith at the nonblind end thereof for engaging the accessible or nonblind side of said members and an axially extending frusto-conically shaped bearing surface on its other end inclined outwardly and towards the nonblind end of said internal part for expanding the end of said blind head part adjacent thereto beyond the yield strength of the material thereof but under the ultimate strength thereof to form a blind head engaging the inaccessible side of said members and to cold work the material of said blind head part upon said frusto-conical surface being forced into said end of said blind head part upon rotation of said blind part relative to said nonblind part in driving said fastener whereby said members are secured together by being embraced between blind and nonblind heads engaging opposite sides thereof one of which heads is relatively hard but more ductile than the internal or blind part of the fastener.

6. In a high shear and load carrying blind fastener for use in attaching together at least two members a side of one of which is inaccessible or blind and having aligned openings therein of substantially uniform diameter with the possible exception of the accessible end which may be counterbored, a relatively non-ductile substantially homogeneous discrete internal or blind metal part having a tensile strength of not less than about 140,000 p.s.i. and a ductility of about 15% to 45% and comprising a cylindrical shank provided with a thread, said blind part including a head formed integral with the blind end of said shank the diameter of which head is approximately 150% of the effective diameter of said shank, a projection forming a driving connection on the nonblind end of said shank connected thereto by a section of less strength than the strength of the minimum cross-sectional area of said shank, a relatively ductile blind head part at least twice as sensitive to cold-working as low carbon basic steel as measured by increase in hardness and having a tensile strength of from about 50,000 p.s.i. to 145,000 p.s.i. and a ductility of about 40% to 76% and being in the form of a continuous cylindrical sleeve internally threaded from end to end and having an outside diameter substantially equal to the diameter of said head of said blind part and being threaded onto said shank of said blind part adjacent to said head thereof, an external or nonblind metal part having a tensile strength not less than a ductility not greater than the tensile strength and ductility of said blind head part threaded onto the threaded section of said shank of said blind part, said nonblind part comprising a cylindrical tubular-like body portion having an outside diameter substantially equal to the diameter of said head of said blind part, said body portion having a head formed integral therewith at the nonblind end thereof for engaging the accessible or nonblind side of said members and an axially extending frusto-conically shaped bearing surface on its other end inclined outwardly and towards the nonblind end of said internal part at an angle of approximately 15° to 21° for expanding the end of said blind head part adjacent thereto beyond the yield strength of the material thereof but under the ultimate strength to form a blind head engaging the inaccessible side of said members and to cold work the material of said blind head part upon said frusto-conical surface being forced into said end of said blind head part upon rotation of said blind part relative to said nonblind part in driving said fastener whereby said members are secured together by being embraced between blind and nonblind heads engaging opposite sides thereof one of which heads is relatively hard but more ductile than the internal or blind part of the fastener.

7. In combination a plurality of members having aligned openings therethrough, a relatively nonductile substantially homogeneous discrete internal or blind part comprising a cylindrical threaded shank having a head formed integral with the blind end of said shank the diameter of which head is approximately 150% of the effective diameter of said shank, said blind part positioned in said apertures with said head thereof at one side of said members, an external or nonblind metal part threaded onto said shank of said blind part and comprising a cylindrical tubular-like body portion having an outside diameter substantially equal to the diameter of said head of said blind part and a head formed integral therewith at the nonblind end thereof in engagement with the side of said members opposite said head of said internal part and an axially extending frusto-conically shaped bearing surface on its other end inclined outwardly and towards the nonblind end of said internal part and a relatively ductile blind head part in the form of a continuous sleeve having an internal thread at at least one end of not less than two convolutions and at no place an inside diameter substantially greater than the maximum thread diameter of said thread on said shank of said blind part threaded onto said shank of said blind part with said one end adjacent to said head thereof and its other end expanded beyond the yield strength of the material thereof but under the ultimate strength thereof by said frusto-conically shaped bearing surface of said external part and engaging the side of said members opposite the side engaged by said head of said external part whereby said members are secured together by being embraced between heads engaging opposite sides thereof one of which heads is relatively hard but more ductile than the internal or blind part of the fastener.

References Cited by the Examiner

UNITED STATES PATENTS

| 2,282,711 | 5/1942 | Eklund | 85—73 |
| 2,971,425 | 2/1961 | Blakeley | 85—73 |
| 3,129,630 | 4/1964 | Wing et al. | 85—72 |
| 3,203,303 | 8/1965 | Laisy | 85—77 |
| 3,222,977 | 12/1965 | Vaughn | 85—72 |

FOREIGN PATENTS

| 145,722 | 3/1952 | Australia. |
| 436,238 | 10/1935 | Great Britain. |

CARL W. TOMLIN, *Primary Examiner.*

MARION PARSONS, JR., *Examiner.*